United States Patent [19]

Tokuda

[11] Patent Number: 5,432,580
[45] Date of Patent: Jul. 11, 1995

[54] PHOTO FINISHING SYSTEM

[75] Inventor: Kanji Tokuda, Kanagawa, Japan

[73] Assignee: Fuji Photo Film Co., Ltd., Kanagawa, Japan

[21] Appl. No.: 159,305

[22] Filed: Nov. 30, 1993

[30] Foreign Application Priority Data

Nov. 30, 1992 [JP] Japan .................... 4-320658

[51] Int. Cl.⁶ .................... G03D 13/00; G03B 27/52
[52] U.S. Cl. .................... 354/298; 354/334; 355/27; 355/77
[58] Field of Search ........ 354/298, 334, 324, 312–314, 354/319–323; 355/27–29, 50, 77; 358/487

[56] References Cited

U.S. PATENT DOCUMENTS

| | | | |
|---|---|---|---|
| 4,864,354 | 9/1989 | Crasnianski | 354/322 X |
| 5,101,286 | 3/1992 | Patton | 358/487 |
| 5,235,369 | 8/1993 | Nakamura et al. | 354/298 |
| 5,307,114 | 4/1994 | Nitsch et al. | 355/29 |

Primary Examiner—D. Rutledge
Attorney, Agent, or Firm—Sughrue, Mion, Zinn, Macpeak & Seas

[57] ABSTRACT

A film developing process and a printing process are simultaneously executed to reduce the photo finishing time. A film processor has a developing unit, a drying unit, and an image pickup unit. A color negative film, sequentially subjected to the developing process and drying process, passes through the image pickup unit, at which an image of each original frame of the color negative film is picked up. The obtained video image data is sent to a printer-processor. The printer-processor has an image processing unit, a video printer unit, and a paper processor unit. The image processing unit corrects density and color of a video image. The video printer unit prints the video image on a color photographic paper in accordance with the processed image data. The paper processor unit develops and dries the printed color photographic paper, and cut it into photoprints by a cutter.

21 Claims, 9 Drawing Sheets

PHOTO FINISHING SYSTEM

BACKGROUND OF THE INVENTION

1. Field of the Invention

The present invention relates to a photo finishing system, and more particularly to a photo finishing system capable of making a hard copy such as a photoprint, by utilizing a film processor with an image pickup unit, in combination with a printer or printer-processor for recording a video image on a recording material.

2. Description of the Related Art

In a photographic mini-lab, a photographic film, e.g., color negative film, is developed by a film processor. The developed negative film is placed in a printer or a printer-processor, wherein the images of original frames recorded on the color negative film are photographically projected onto a color paper to make photoprints. With such a photo finishing system, a color negative film is first developed, and then the developed film is set into a printer or a printer-processor. Therefore, in such a photo finishing system, a color negative film cannot be placed into a printer or printer-processor before it has been completely developed by the film processor.

Figure 10:
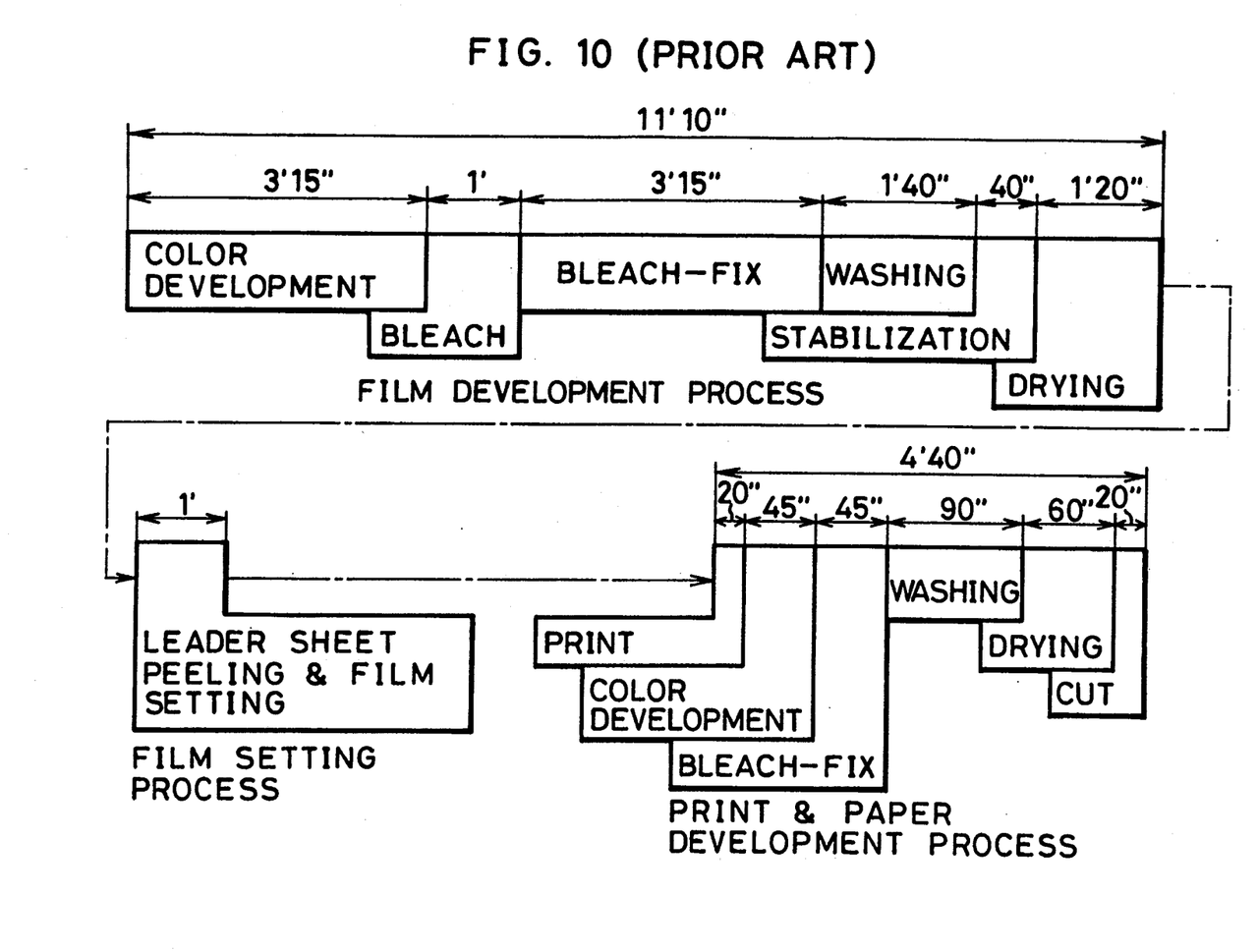
FIG. 10 is a diagram illustrating the various times required for processes to be executed by a conventional photo finishing system.

As shown in FIG. 10, making photoprints with a conventional photo finishing system by using a printer-processor includes a film development process, a film setting process, a print process, and a paper development process. It takes a minimum of about 20 minutes to develop a customer-deposited exposed negative film and obtain final photoprints. A film processor processes color negative films one roll after another, and each color negative film is coupled with a sturdy or stiff leader sheet. After the development process, the sheet is peeled off from the film. This peeling work is cumbersome and takes tens of seconds or more. Furthermore, it is necessary to manually place a developed negative film in a printer or printer-processor, and damage of the developed film may occur during such manual handling.

Figure 11:
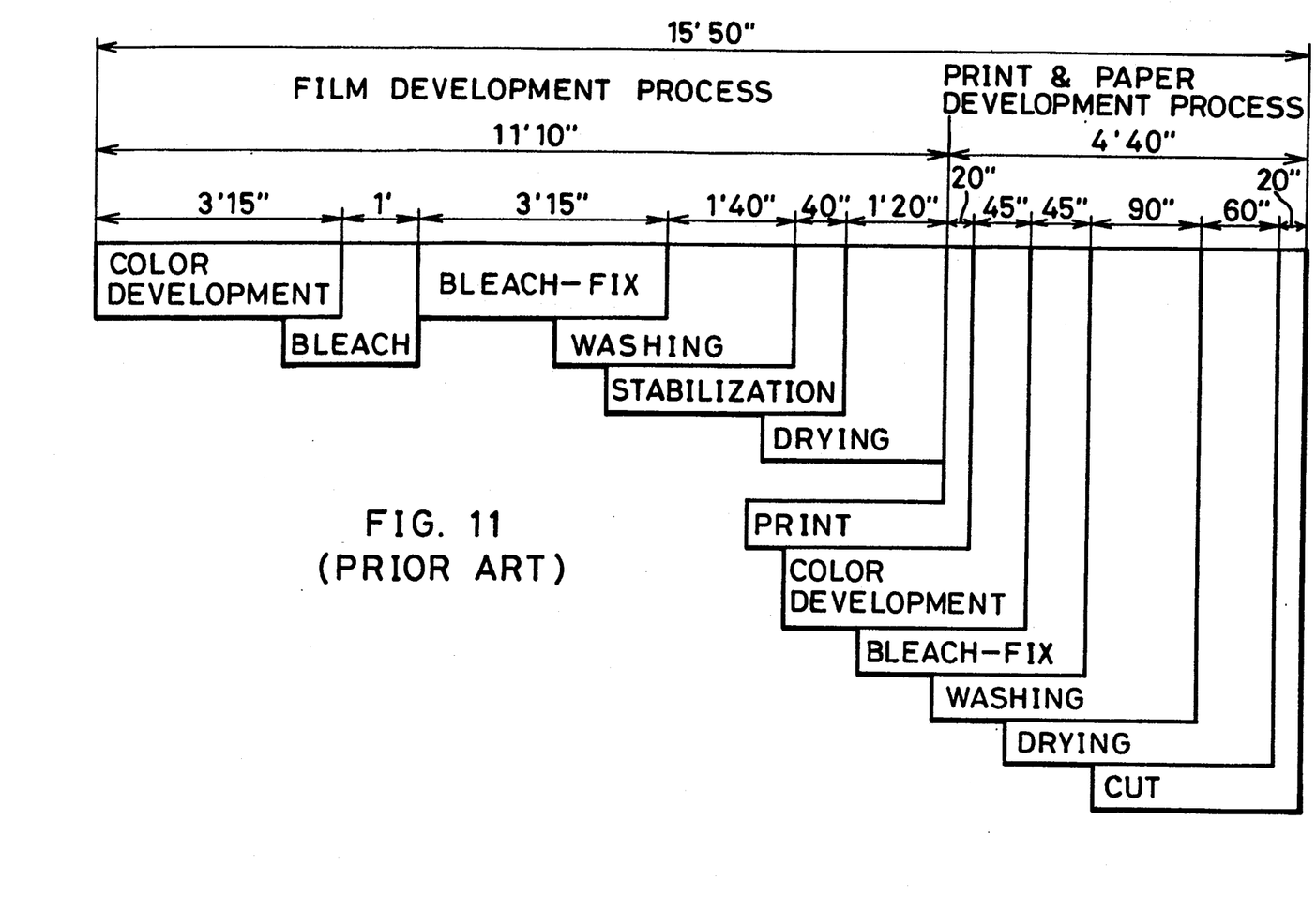
FIG. 11 is a diagram illustrating the various times required for processes to be executed by a photo finishing system combining a film processor and a printer-processor.

As shown in FIG. 11, it is conceivable that a film processor and printer-processor may be coupled together to feed a color negative film developed by the film processor directly to the printer-processor, thereby lessening the processing time. In this case, however, it is necessary to provide a film guide mechanism and the like for automatically feeding a developed color negative film from the film processor to the film carrier of the printer-processor. Such a guide mechanism serves to complicate the system structure.

SUMMARY OF THE INVENTION

It is a principal object of the present invention to provide a photo finishing system capable of lessening the time required for obtaining photoprints from an exposed negative film.

It is another object of the present invention to provide a photo finishing system which is not likely to damage the photographic film.

The above and other objects are achieved by a film processor having an image pickup unit for scanning an original frame and obtaining image data immediately after the drying process of a developed color photographic film. The obtained image data is sent to an image processing unit to correct the density and color of each original frame. This correction process includes a correction calculation for the particular film type and density and color deviation of original frames, and a gradation correction for the printer characteristics and customer preference. The printer (including a printer-processor) forms a print frame on a recording material in accordance with the processed image data.

According to a preferred embodiment of the present invention, a laser printer is used for printing a video image on a photosensitive material by using a laser beam. With the laser printer, the printing operation can be executed while transporting the photosensitive material, and a loop forming mechanism necessary for a conventional frame sequential exposure method is not needed, simplifying and compacting the structure. According to another preferred embodiment of the present invention, one of an inserter, a splicer, and a film winding unit is provided to deal with a developed photographic film. The inserter cuts a photographic film into each piece of a predetermined number of frames, and inserts each film piece into a pocket of a film sheath. The splicer splices photographic films with a splice tape. The film winding unit wounds the photographic film into a preservative cartridge in the form of film roll.

According to the present invention, after the development process of a color negative film, an image of a frame is picked up and the obtained video image is printed on a recording material. Accordingly, a hard copy print can be produced simultaneously with the photographic film handling process and the like after the drying process. This reduces the photo finishing time by the amount corresponding to the film handling process and thus simplifies the operation. Accordingly, an urgent photo finishing ordered by a customer can be handled in a short time, reducing a customer waiting time.

Also, it is not necessary to manually set a developed photographic film into the printer-processor. Accordingly, photographic films will not tend to become dirty or scratched because contact with the operator's hands or mechanical apparatus is reduced. Photoprints of a good quality can therefore be obtained. Furthermore, it is possible to start the image data processing immediately after reading all original frames of a roll of a photographic film. In this case, by the image processing operation, image data correction can easily be made in accordance with the type of the negative film and the total photographic characteristics of the scenes photographed. The printer-processor preferably has first and second exposure systems, the first exposure system using a negative film for the printing exposure, and the second exposure system using image data relating to the frame to be printed. The first exposure system is used for making additional photoprints by projecting an image of an original frame of a developed photographic film onto a photosensitive material, and the second exposure system is used for making photoprints for the first time upon development of an exposed photographic film. The printer-processor of the invention has a variety of applications.

BRIEF DESCRIPTION OF THE DRAWINGS

The above objects and advantages of the present invention will become more apparatus upon reading the detailed description of the embodiments in connection with the accompanying drawings.

DETAILED DESCRIPTION OF THE PREFERRED EMBODIMENTS

Figure 1:
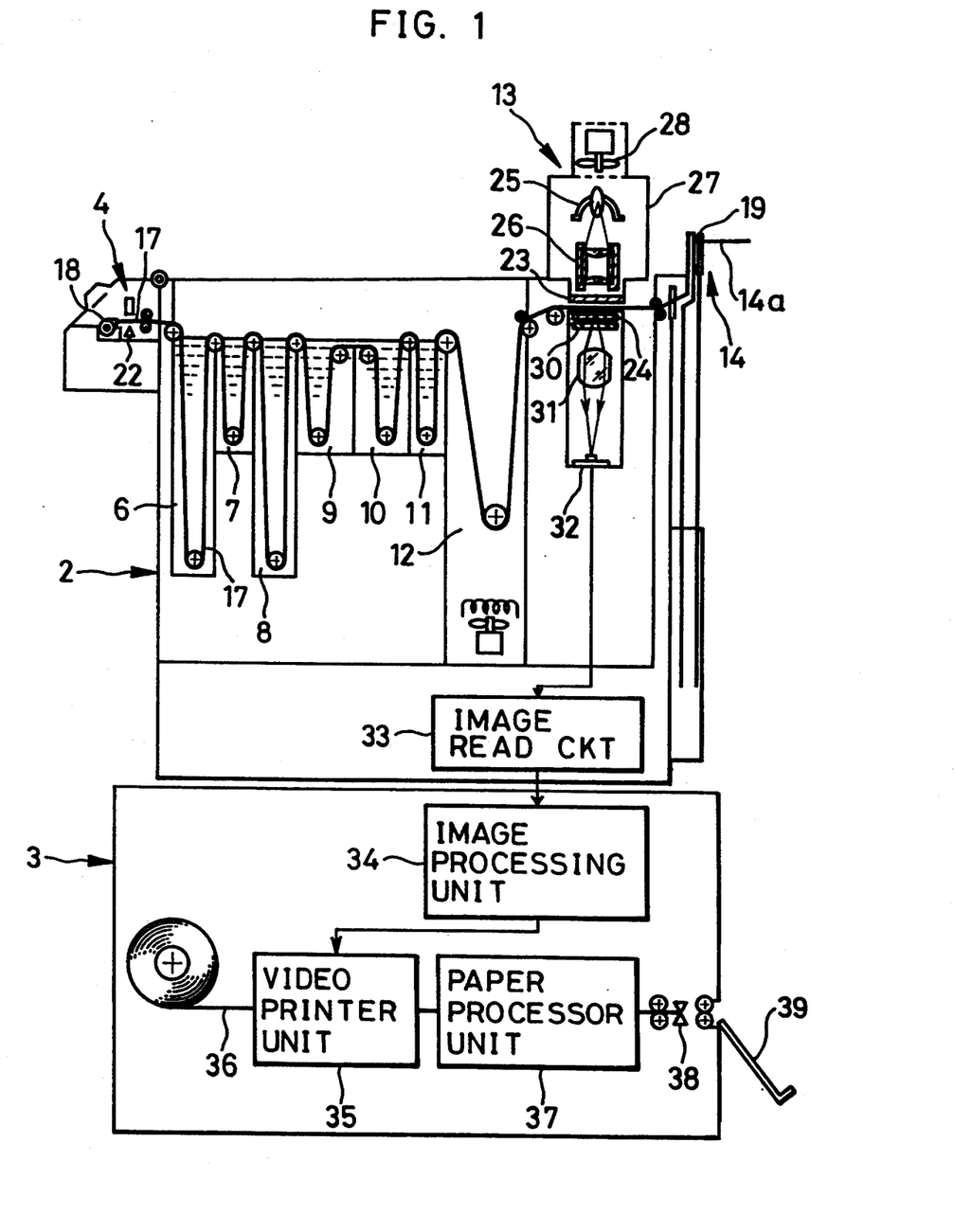
FIG. 1 is a schematic diagram showing a preferred embodiment of a photo finishing system according to the present invention.

A photo finishing system according to the first preferred embodiment shown in FIG. 1 and is constructed of a film processor 2 and a printer-processor 3. The film processor 2 has a film setting unit 4, various processing vessels 6 to 11, a drying unit 12, an image pickup unit 13, and a film stacker unit 14. An exposed photographic film, e.g., a color negative film 17, is wound up and accommodated within a cassette 18 in the manner well known in the art. In developing the color negative film 17, first the leader of the color negative film 17 is pulled out of the cassette 18 by using a known leader catching jig, and the leader is joined with a leader sheet 19. The leader sheet 19 has perforations formed at the center thereof at an equal pitch. These perforations engage with an endless belt or sprocket having a number of protrusions also formed at the same pitch. Through this engagement, the film 17 is transported into the film processor 2.

The film setting unit 4 is loaded with the cassette 18 having the leader of the color negative film 17 joined to the leader sheet 19. As the leader sheet 19 advances, the color negative film 17 is pulled out of the cassette 18 and guided through the various processing vessels 6 to 11 in seriation. When the color negative film 17 is completely pulled out of the cassette 18, the film trailing end is cut by a cutter 22 to separate the color negative film 17 from the cassette 18. As is well known, the processing vessels 6 to 11 include a color development vessel 6, a bleach vessel 7, a bleach-fix vessel 8, super rinsing vessels 9 and 10, and a stabilizing vessel 11. The negative film 17, after being processed in the processing vessels 6 to 11, is dried with hot air in the drying unit 12. The leader sheet 19 of the color negative film 17 exiting from the drying unit 12 is held by a hook 14a of the film stacker unit 14, after signals representing images of original frames of the film 17 have been generated by the image pickup unit 13 in the manner described below.

The color negative film 17 enters the image pickup unit 13 immediately past the drying process and passes between two transparent glass plates 23 and 24 and the images of original frames are read. In order to read the images of original frames, a light source unit 27, made of a lamp 25 and condensor lens unit 26, is mounted above the transparent glass plate 23. A cooling fan 28 is provided to circulate air around the lamp 25. Mounted under the transparent glass plate 24 are a slit plate 30, a lens 31, and a CCD line sensor 32. A narrow slit is formed in the slit plate 30 in the widthwise direction of the color negative film 17. Light passed through the color negative film 17 under transportation falls incident on the light receiving surface of the color line sensor 32 via the slit plate 30 and lens 31.

The color line sensor 32 is constructed of a number of CCD elements disposed in a matrix and R, G, and B color mosaic filters mounted on each CCD line. The dynamic range upper limit of a usual CCD line sensor is about $D=2$ as expressed by the brightness value, which is smaller than the maximum density $D=3.5$ of a typical image on a color negative film. Therefore, an image on a negative film cannot always be read correctly with such a CCD line sensor. However, the dynamic range upper limit of the tone of color dyes of a color negative film is about $D=1.5$ so that the image can be read by changing the storage time in a known manner. In order to set this storage time in advance, it is preferable in addition to the CCD line sensor 32, to use a pre-scan CCD sensor for detecting the maximum density of an image in a known manner, the pre-scan CCD being mounted upstream from the color line sensor 32. Instead of a color image line sensor for reading an image, line by line, synchronously with the film advance, a color image area sensor may be used for reading an entire image of a film at one time. An image read circuit 33 drives the color line sensor 32 to read the image data corresponding to one line of the image on the film. This image data is sent to the printer-processor 3.

In the printer-processor 3, an image processing unit 34 processes the image data sent from the film processor 2. At the image processing unit 34, the color and density are corrected in a known manner. The image data with the corrected color and density is sent to a video printer unit 35. This correction includes a correction calculation for the particular film type and density and color deviation of original frames, and a gradation correction for the printer characteristics and aesthetic preferences. The video printer unit 35 prints and exposes a color photographic paper 36 in accordance with the corrected image data in a known manner. The exposed color photographic paper 36 is developed by a paper processor unit 37 and cut into photoprints by a cutter 38 and ejected out onto a tray 39. In this embodiment, the film processor 2 and the printer-processor 3 are separate, but may be mounted integrally in a single housing. The image processing unit 35 may be mounted separately.

Figure 2:
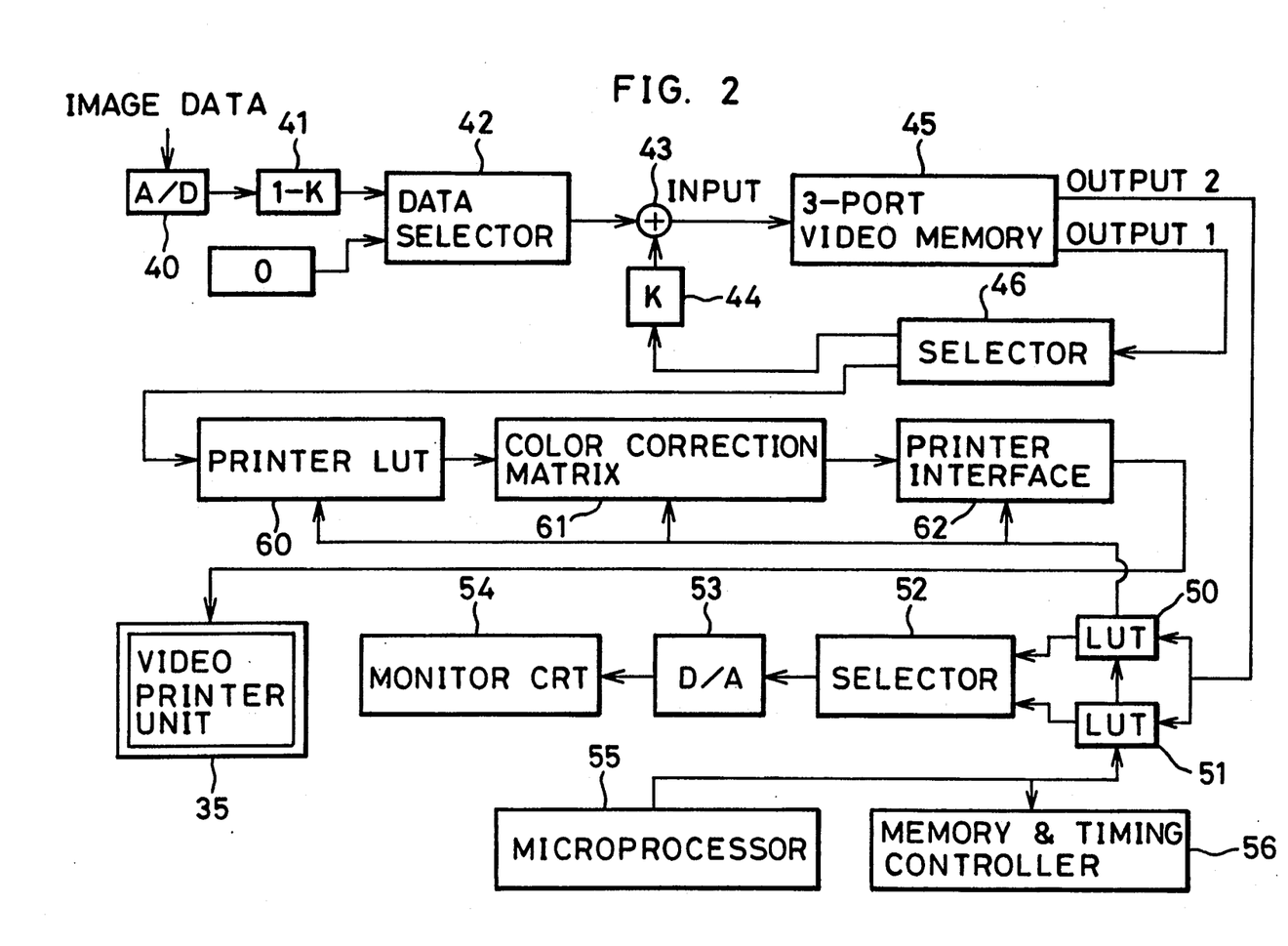
FIG. 2 is a block diagram showing the image processing unit.

FIG. 2 is a block diagram showing the image processing unit 34 having a gradation correction function. Three color image data, in the form of analog electric signals, from the color line sensor 32 is digitized by an A/D converter 42, and inputted to a multiplier 41. The multiplier 41 multiples the input three color image data by a coefficient $(1-K)$ to suppress noises. This image data is then inputted via a selector 42 to an adder 43 to be added to the data from a multiplier 44, the result being supplied to a three-port video memory 45. This video memory 45 outputs two types of image data each having a different transfer speed, so that the image data can be outputted at the same time at peripheral terminal apparatuses having different transfer speeds (e.g., a CRT display and a photographic printer, which have a large transfer speed difference therebetween). The image data having a slower transfer speed is referred to as an output 1, and that having a faster transfer speed is referred to as an output 2. The output 1 is provided with two transfer speeds, one being the same as that of an input from the image pickup unit 13 and the other suitable for use with the video printer unit 35. The output 2 is provided with a transfer speed suitable for a CRT display.

The image data output 1 is supplied to the multiplier 44, multiplied by a coefficient K for noise elimination, and inputted to the adder 43. The image data output 1 inputted to the multiplier 44 at any given time is the image data corresponding to one frame before the image data from the data selector 42 at the same time. In this manner, noise components of the image data are eliminated. If the coefficient K of the multiplier 54 may be set to "1", if the input data at a desired area may be set to "0" at the data selector 46, if the selector 46 operates to select the output 1 only for the above-described desired area, if the transfer speed of the output 1 is doubled, and if the image data output 1 is thinned every second pixel and inputted to the adder 43, then the one image preceding to a frame is reduced to a half size and superposed within the current frame image at the above-described desired area known as a "picture-in-picture"). If the image data is not thinned and the write area is controlled, it is possible to display the same image side by side in one frame in a known manner.

The image data output 2 is subjected to gamma correction and the like at look-up table memories 50 and 51 (hereinafter called LUT). The corrected image data is then supplied via a selector 52 to a D/A converter 53, converted into an analog signal, and supplied to a monitor CRT 54. LUTs 50 and 51 are used independently for the color tone correction of the current frame image and inserted image during the picture-in-picture mode, to display them on the monitor CRT 54. In this manner, the image before the color correction (reduced in size) and the image after color correction can be compared in real time for the color tone correction.

LUTs 50 and 51 include high speed memory services which have predetermined data stored at each address in advance under the control of a microprocessor 55, to allow color tone conversion in a known manner. In addition to the renewal of data in LUTs, the microprocessor 55 controls the renewal of coefficients of a color correction matrix and multipliers. Reference numeral 56 represents a memory and timing controller.

In transferring the frozen image data to the video printer unit 35, the image data is read from the video memory 45 as the image data output 1. The image data output is subjected to tone conversation by a printer LUT 60. Correction data stored in this LUT 60 is renewed by input data from a keyboard to convert the image tone. The tone converted image data is then corrected by a color correction matrix circuit 61 to match the color characteristics of a color paper or the like. The corrected image data is then supplied via a printer interface 62 to the video printer unit 35. Note that the density of dyes of a color negative film immediately after the drying process are different from that of the same dyes in the final stable state. In this context, the color correction matrix circuit 61 performs the color correction while considering not only the color characteristics of the color paper, but also a difference in the tone and spectral characteristics of color dyes of the color negative film 17 immediately after the drying process.

The photo finishing cycle time of this embodiment is the same as that of the continuous processing explained in FIG. 11. In this embodiment, as described above, an image on an original frame of the color negative film 17 to be printed is scanned and picked up synchronously with the film advance after being removed from the drying unit 12. Immediately thereafter, the picked-up image data is used for a digital printing operation. Therefore, the transit time (about one minute) between the film development process and the printing process is not necessary. The processing time for a color negative film can be lessened by this transit time. It is therefore possible to omit the manual operations of taking out the developed film from the film processor, peeling off the leader sheet, and then setting the film to the printer-processor. In this way, the total process time from receiving a photo finishing order to delivering finished photoprints, can be shortened. At a mini-lab, an urgent photo finishing order can be handled in a shorter time and more easily, thus reducing a customer's waiting time.

Figure 3:
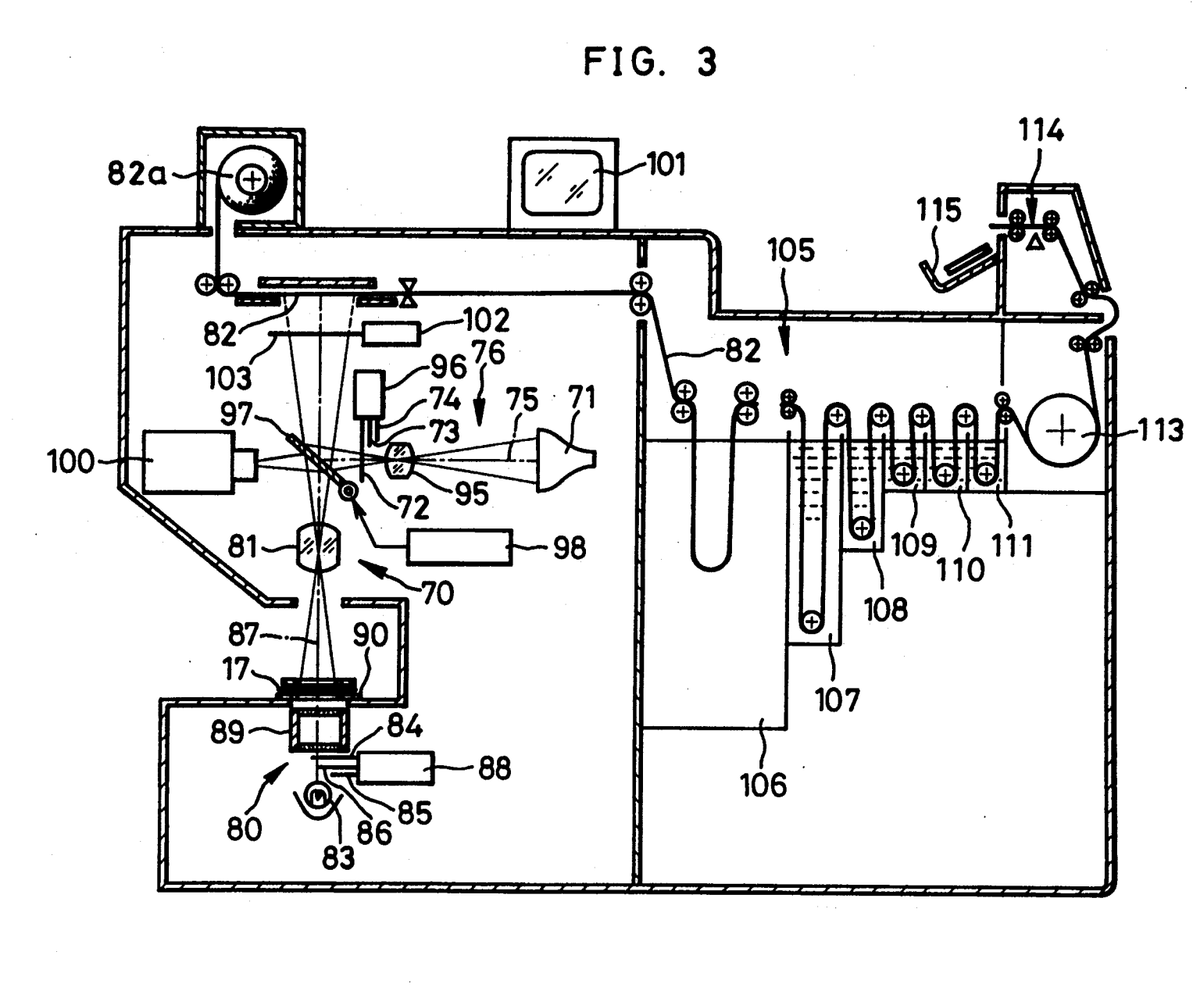
FIG. 3 is a schematic diagram showing another preferred embodiment of the printer-processor.

Next, referring to a FIG. 3, another preferred embodiment of the printer-processor will be described. This embodiment can selectively perform color negative film printing and video printing. This printer-processor has a first exposure system 70 using the developed color negative film 17, and a second exposure system 76 whereby three color image data supplied from the film processor is displayed on a monochrome CRT 71 to perform three color frame sequential exposure while respectively inserting three color filters 72 to 74 into a print optical path 75. The first exposure system 70 is mainly used for extra printing of additional photoprints from previously processed film, and the second exposure system 76 is used for developing a new exposed photographic film and making photoprints.

In the first exposure system 70, the light source unit 80 applies light to a frame of the color negative film 17 to be printed, and focuses the light via a print lens 81 onto a color photographic paper 82, to thereby print the image frame onto the paper 82. The light source unit 80 has a light source 83, three color filters 84 to 86 for controlling the light intensity and balance of the light source 83 corresponding to each color, a color filter driving unit 88 for inserting the three color filters 84 to 86 into a print optical path 87, and a mixing box 89 for uniformly diffusing a printing light having controlled intensity and color balance. The color negative film 17 is set on a film carrier 90 which, as well known, sets the frame to be printed at a printing position.

The second exposure system 76 has the monochrome CRT 71, a printing lens 95 for focusing an image displayed on CRT 71 onto a color photographic paper 82, and a filter setting unit 96 for the three color frame sequential exposure of the image displayed on CRT 71 onto the color paper 82. A mirror 97 is mounted so as to be movable into and out of the print optical path 87 to focus an image to the color paper 82, by selecting one of the first and second exposure systems 70 and 76. A selecting unit 98 operates to set the mirror 97 either to a retracted position from the print optical path 87 or to a position where the mirror 97 is inserted into the print optical path 87 at an inclined angle of 45 degrees. Instead of the mirror 97 and selecting unit 98, a half mirror or half prism may be used to direct light in a known manner. TV camera 100 is used to display the image on the color negative film 17 on a monitor CRT 101. Reference numeral 102 represents a shutter driver for opening and closing a shutter 103.

A printed color paper 82 is transported to a paper processor unit 105 having a paper reservoir 106 for reserving a loop of the color paper 82 so as to absorb a difference between the printing speed and paper developing speed. The reserved color paper 82 of a predetermined length is thereafter developed at processing vessels 107 to 111, dried by a dryer drum 113, cut into each frame by a cutter 114, and ejected onto a print tray 115. The printer unit having the first and second exposure systems 70 and 76 can select either one of them in accordance with a photo finishing order by a customer, satisfying a particular customer's desire. Accordingly, this printer unit may be used in different modes of operation. Namely, an optional frame image of a negative film under the photographic process can be first printed using the second exposure system 76, and then, after checking visually the result of this finished print, the final printing is executed using the first exposure system 70. Furthermore, a layout process can be performed using the second exposure system 76 to make an index print having a plurality of reduced image frames, and, based upon the result of this finished index print, the final printing is executed using the first exposure system 70.

In this embodiment, a reader for reading a DX code or frame number bar code of the color negative film 17 may be added to the image pickup unit 13 and the image pickup unit 13 may be structured to read these codes. An optical color printer is used in this embodiment for the three color frame sequential exposure of an image displayed on a monochrome CRT onto a photographic color paper 82, with the color filters inserted successively. Instead of the optical color printer, a thermal color video printer or ink-jet video printer may also be used. As the recording stylus of an optical color printer, in addition to a CRT, a liquid crystal panel or laser beam may also be used.

Figure 4:
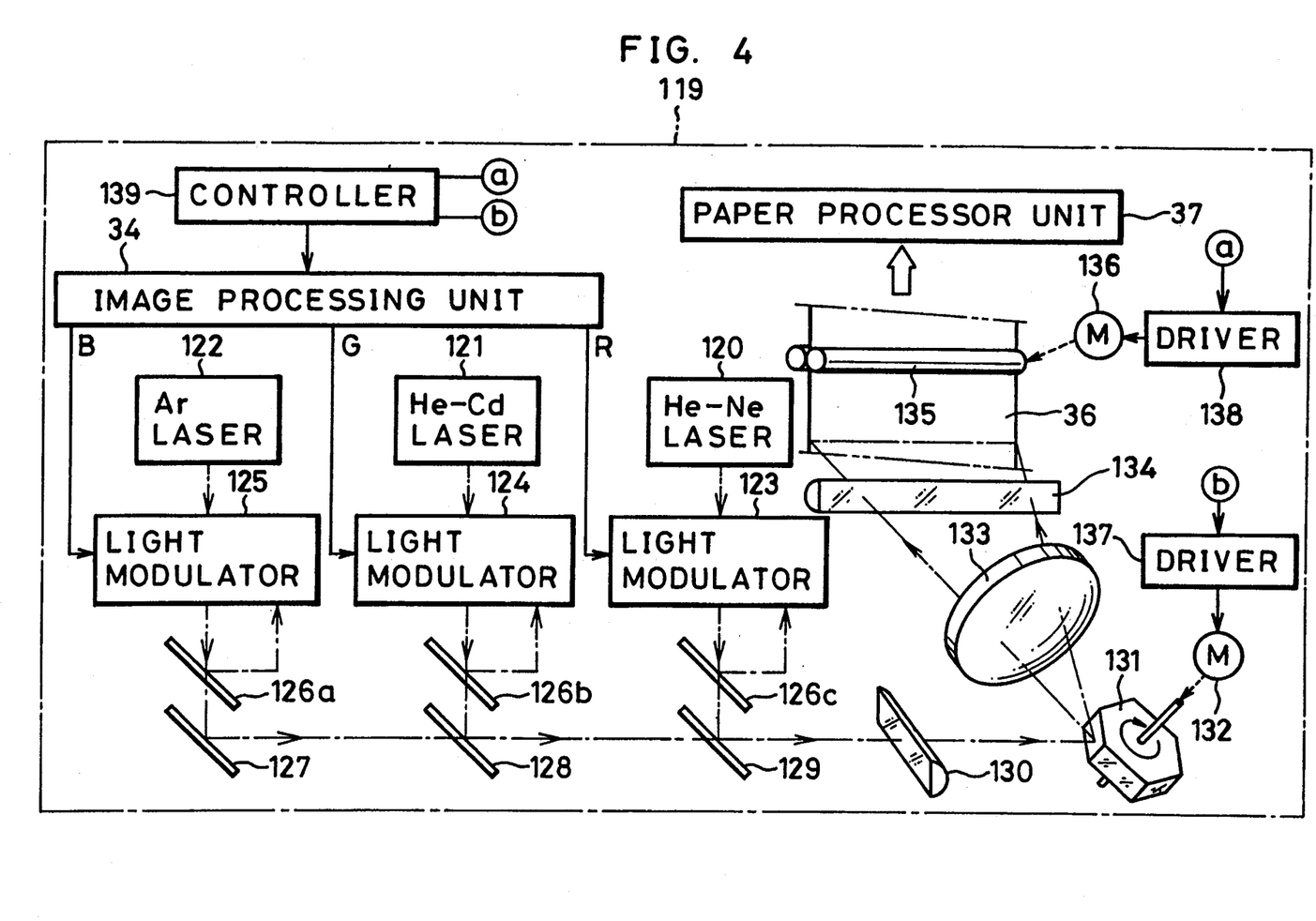
FIG. 4 is a schematic diagram showing an embodiment of a laser printer.

FIG. 4 shows a video printer unit using laser beams. The video printer unit 119 has an He—Ne laser 120 for emitting a red beam, an He—Cd laser 121 for emitting a green beam, and an Ar laser 122 for emitting a blue beam. Laser beams emitted from the lasers 120 to 122 are modulated by light modulators 123 to 125 in accordance with the image data sent from an image processing unit 34. In order to check whether the intensity of each laser beam is proper, prior to the start of printing, each laser beam is intensity-modulated by standard image data, is partially picked up by beam splitters 126 and is fed back to the light modulators 123 to 125. Semiconductor lasers may also be used in place of gas lasers.

The laser beams modulated by the image data are converged into one beam by a mirror 127 and dichroic mirrors 128 and 129, and is made parallel beams by a known collimator optical system (not shown) to be applied via a cylindrical lens 130 to a polygon mirror 131. The polygon mirror 131 rotated at a high speed by a motor 132 swings the laser beam in the widthwise direction of the color photographic paper 36. One main scan is performed by each facet of the polygon mirror 131. The focussing optical system made of an fθ lens 133 and cylindrical lens 134 focusses the laser beam deflected by the polygon mirror 131 onto the color photographic paper 36 to make it have a beam diameter corresponding to the exposure density of the paper 36.

A paper feed roller pair 135 feeds the color photographic paper 36 in the subsidiary scan direction synchronously with the main scan of the laser beam. The paper feed roller 135 is rotated by a motor 136. The rotation of the motors 132 and 136 connected via respective drivers 137, 138 is controlled by a controller 139 in response to a synchronizing signal from the image processing unit 14. With the subsidiary scan of the color paper and the main scan of the laser beam, an image of a frame on the color photographic paper 36 is printed and exposed on the color negative film 17. The printed color photographic paper 36 is sent to the paper processor unit 37 and developed. As is well known, the developed color photographic paper 36 is cut into each photoprint and ejected onto a tray.

Figure 5:
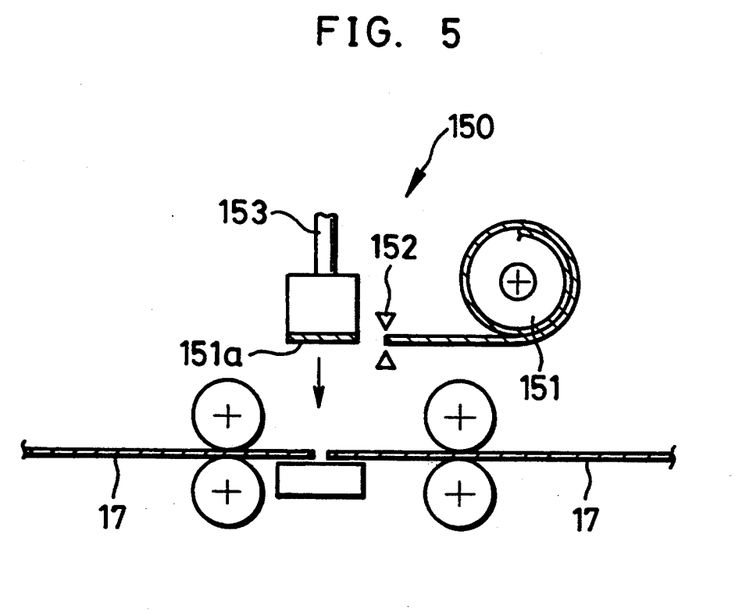
FIG. 5 is a schematic diagram showing a splicer.
Figure 6:
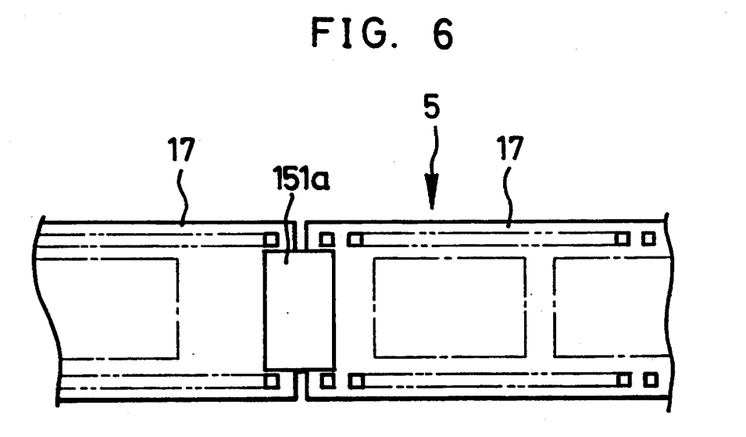
FIG. 6 is a diagram illustrating color negative films spliced by a splicer tape.

Each color negative film 17 hung on the film stacker unit 14 is set to a cutting inserter one after another, cut into pieces of every six frames, and inserted in each pocket of a film sheath. In order to improve the insertion operation for a film piece into each pocket, it is preferable to join color negative films 17 to make an elongated film 5. FIGS. 5 and 6 illustrate such an embodiment. The color negative films 17 are joined together by a splicer 150 having a cutter 152 for cutting a roll of splice tape into each splice tape piece 151a and a mechanism 153 for holding the splice tape piece 151a and attaching it to the joint area between the color negative films 17.

Figure 7:
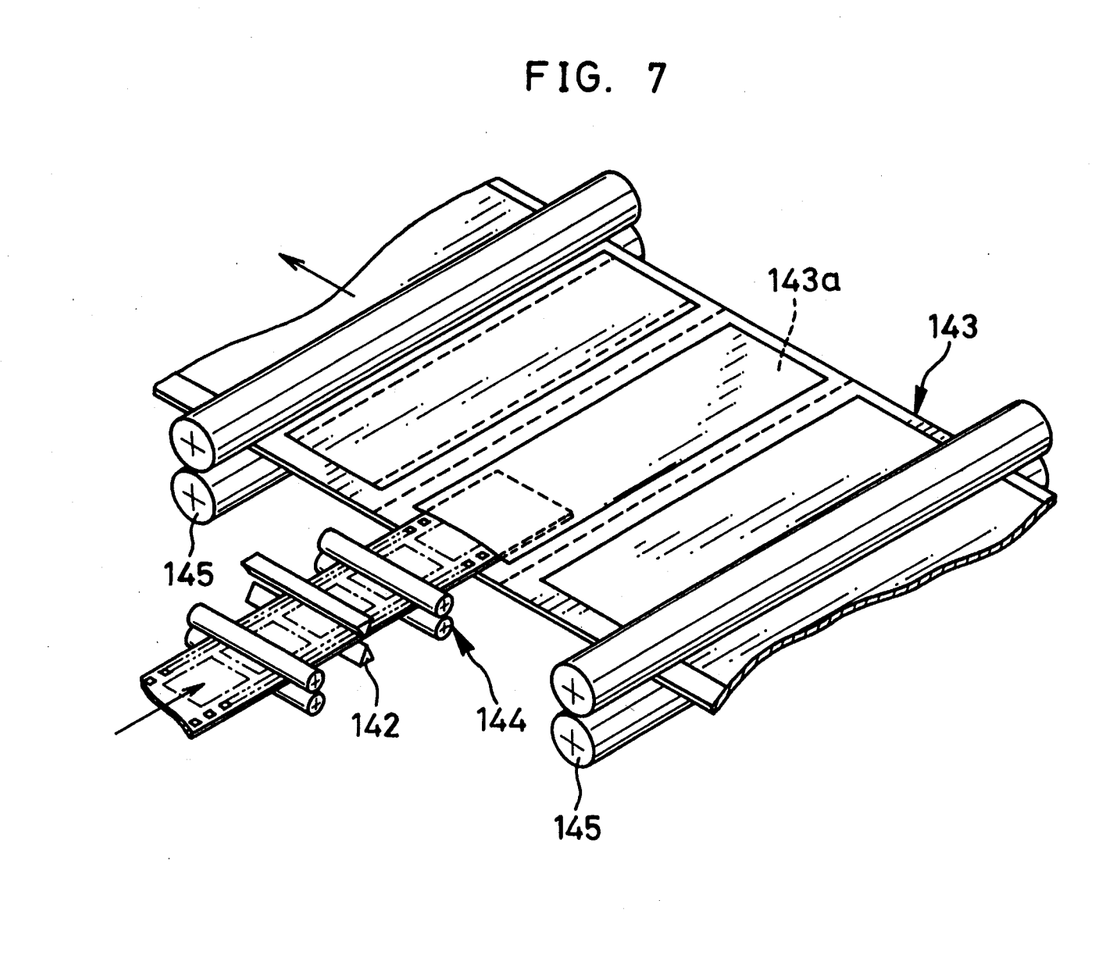
FIG. 7 is a perspective view of an inserter.

FIG. 7 illustrates an embodiment in which a film cutting inserter is used in place of the film stacker unit 14. This film stacker unit 14 has a cutter 142, film transport rollers 144, and sheet transport rollers 145. The cutter 142 cuts the single color negative film 17 into each piece of a predetermined number of frames, e.g., six original frames. The film transport rollers 144 sequentially transport the negative film pieces into pockets 143a of the film sheath 143. The sheet transport rollers 145 transport the film insertion direction and sequentially move the pockets 143a to the setting position at the negative piece transport path. The color negative film 17 is directly fed by transport rollers or belt.

A printing system has been proposed in which photographing information for each original frame is magnetically recorded near the frame to allow pseudo zoom printing or the like (in such documents as Japanese Patent Laid-Open Publications Nos. 62-103625, 62-208028, 1-279231, and 1-289928). A color negative film used for this system is coated with a transparent magnetic recording layer on which photographing information, printing information, or the like is recorded by a camera, printer, or the like. Such information may become unreadable if a color negative film with a magnetic recording layer is cut. In such a case, the photographic information cannot be used effectively in making additional photoprints. For this reason, it is preferable to accommodate the single color negative film 17 in a cartridge in the form of a one-piece roll.

Figure 8:
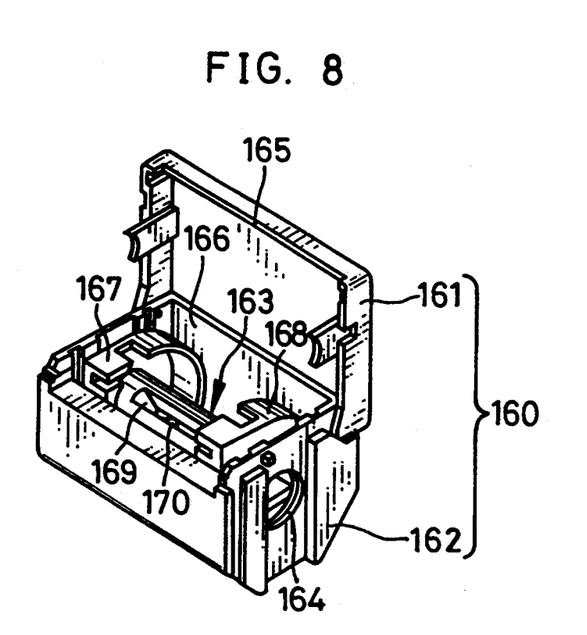
FIG. 8 is a perspective view of a preservative cartridge.
Figure 9:
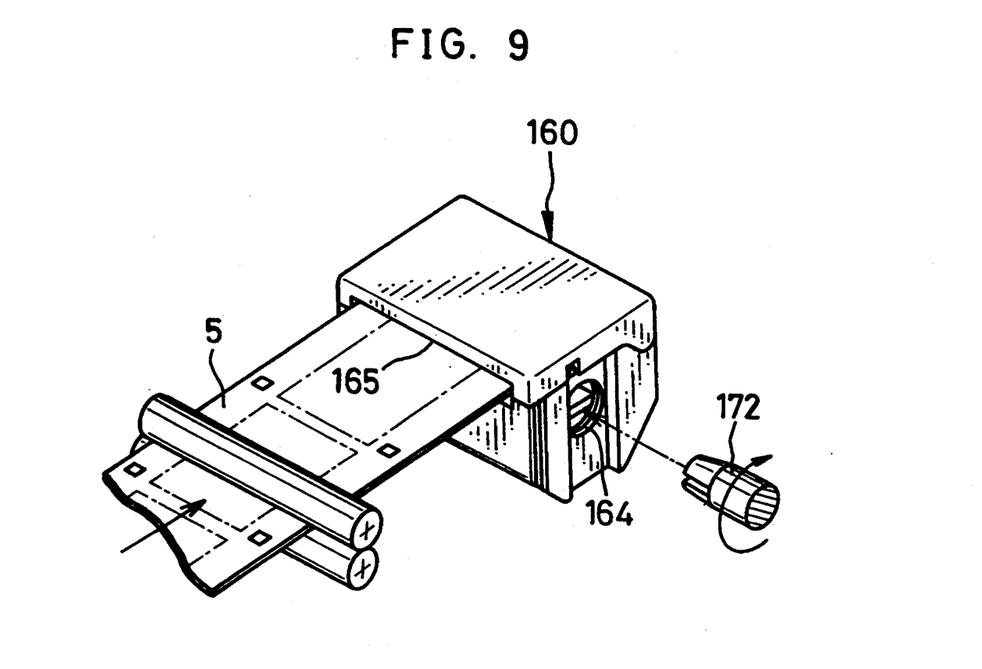
FIG. 9 is a perspective view of the preservative cartridge housing a color negative film.

FIGS. 8 and 9 illustrate an embodiment in which the single color negative film 17 is rolled in a preservative cartridge 160. The preservative cartridge 160 is formed by a lid 161 to be opened and closed, a cartridge main body 162, and a spool 163. The cartridge main body 162 is formed with an opening 164 for exposing the engaging end of the spool 163. When the lid 161 is closed, a film passage mouth 165 is formed between the lid 161 and cartridge main body 162. The cartridge 160 may be configured as a sleeve type like a conventional film cartridge having a pair of shell halves being connected together. A film accommodating chamber 166 is formed in the cartridge main body 162 to accommodate the color negative film 17 in the form of film roll. The spool 163 is rotatably mounted in the film accommodating chamber 166. Two fixing disks 167 and 168 having a flange engage with the opposite sides of the spool 163, the disks 167 and 168 having the inner diameter same as the maximum winding diameter of the color negative film 17. A slit 169 is formed in the spool 163 into which the color negative film 17 is inserted, and a claw 170 is formed within this slit 169 to engage with the inserted color negative film 17.

After the images of original frames of one roll of the color negative film 17 have been taken by the image pickup unit 12, a hole to be engaged with the claw 170 is punched out by a puncher or the like, and transported to the preservative cartridge 160. The trailing end of the color negative film 17 is therefore inserted via the film passage mouth 165 into the cartridge main body 162. The film trailing end is further in the slit 169 of the spool 163. At this time, the slit 169 is rotated by a fork 172 in the transport direction of the color negative film, and located at a predetermined position. When the trailing end of the color negative film 17 inserts into the slit 169, the hole of the color negative film 17 engages with the claw 170. Then, the fork 172 is rotated in the film winding direction by coupling the fork 172 to the spool 163 via the opening 164, until the whole of the color negative film 17 is wound about the outer circumference of the spool 163.

In the preservative cartridge 160, the color negative film 17 is tightly wound about the spool 163 by means of the fixing disks 167 and 168 with the flange. When the spool 163 is rotated in the unwinding direction, the film roll rotates while following the rotation of the spool 163. During rotation, the film leader is separated by a separation claw and advanced via the film passage mouth to the outside.

It is apparent that various modifications, improvements, and the like can be made to the embodiments described above without departing from the scope of the invention as defined by the appended claims.

What is claimed is:

1. A photo finishing system for making a hard copy while simultaneously developing an exposed photographic film, comprising:
   a film processor having a developing unit and a drying unit to sequentially execute a developing process and a drying process of said exposed photographic film as said film moves in a downstream direction;
   an image pickup unit disposed in said film processor downstream from said drying unit, said image pickup unit generating an electrical image signal having image data which represents an image of an original frame of said photographic film; and
   a printer for printing a reproduced image of said original frame on a recording material in accordance with said image data.

2. A photo finishing system according to claim 1, further comprising an image processing unit for processing said image data, said image processing unit executing at least one of a correction calculation for a photographic film type, a correction calculation for each original frame, and a correction calculation for the characteristics of said printer and a finishing preference.

3. A photo finishing system according to claim 2, wherein said image processing unit is provided in said printer.

4. A photo finishing system according to claim 1, wherein said photographic film is a color negative film, and said recording material is a photographic color paper.

5. A photo finishing system according to claim 4, wherein said printer has a paper processor unit for processing a printed color photographic paper.

6. A photo finishing system according to claim 5, wherein said image pickup unit includes an image line sensor for scanning an image of an original frame of said color negative film, line by line, synchronously with transportation of said color negative film.

7. A photo finishing system according to claim 6, wherein said printer includes:
   a monochrome CRT for sequentially displaying each color image as a monochrome image in accordance with red, green and blue image data components of said image data;
   red, green, and blue filters being selected in correspondence with said red, green and blue image data components to be inserted between said monochrome CRT and said color photographic paper; and
   a printing lens for projecting a monochrome image through a selected one of said color filters onto said color photographic paper.

8. A photo finishing system according to claim 6, wherein said printer includes:
   a light source unit for generating red, green, and blue beams;
   a light modulator unit for generating an intensity-modulated beams by modulating the intensity of red, green and blue beams in accordance with red, green, and blue image data components of said image data;
   synthesizing means for converting said intensity-modulated beams into a single synthesized color beam;
   a rotatable polygon mirror for scanning said single synthesized color beam onto said color photographic paper in the widthwise direction; and
   means for transporting said color photographic paper synchronously with the rotation of said polygon mirror.

9. A photo finishing system according to claim 6, further comprising a cutter for cutting said color negative film passed through said image pickup unit into negative film pieces of a predetermined length, and inserting means for inserting said negative film pieces into pockets of a film sheath.

10. A photo finishing system according to claim 6, further comprising a splicer unit for sequentially splicing with a splice tape said color negative films passed through said image pickup unit so as to form an elongated film.

11. A photo finishing system according to claim 6, further comprising film winding unit means for winding said color negative film, passed through said image pickup unit, into a preservative cartridge.

12. A photo finishing system according to claim 6, wherein said preservative cartridge includes a cartridge body, and a spool rotatably housed within said cartridge body for winding said color negative film about the outer circumference of said spool.

13. A photo finishing system for making a hard copy while simultaneously developing an exposed photographic film, comprising:

a film processor having a developing unit and a drying unit to sequentially execute a developing process and a drying process of said exposed photographic film as said film moves in a downstream direction;

an image pickup unit disposed in said film processor downstream from said drying unit, said image pickup unit generating image data which represents an image of an original frame of said photographic film;

a printer for printing a reproduced image of said original frame on a recording material in accordance with said image data; and an image processing unit for processing said image data, said image processing unit executing at least one of a correction calculation for a photographic film type, a correction calculation for each original frame, and a correction calculation for the characteristics of said printer and a finishing preference.

14. A photo finishing system as claimed in claim 13 wherein said image processing unit is provided in said printer.

15. A photo finishing system for making a hard copy while simultaneously developing an exposed photographic film, comprising:

a film processor having a developing unit and a drying unit to sequentially execute a developing process and a drying process of said exposed photographic film as said film moves in a downstream direction;

an image pickup unit disposed in said film processor downstream from said drying unit, said image pickup unit generating image data which represents an image of an original frame of said photographic film, said image pickup unit includes an image line sensor for scanning an image of an original frame of said color negative film, line by line, synchronously with transportation of said color negative film; and a printer for printing a reproduced image of said original frame on a recording material in accordance with said image data, said printer has a paper processor unit for processing a printed color photographic paper;

said photographic film being a color negative film, and said recording material being a photographic color paper.

16. A photo finishing system according to claim 15, wherein said printer includes:

a monochrome CRT for sequentially displaying each color image as a monochrome image in accordance with red, green and blue image data components of said image data;

red, green, and blue filters being selected in correspondence with said red, green and blue image data components to be inserted between said monochrome CRT and said color photographic paper; and a printing lens for projecting a monochrome image through a selected one of said color filters onto said color photographic paper.

17. A photo finishing system according to claim 15, wherein said printer includes:

a light source unit for generating red, green, and blue beams;

a light modulator unit for generating an intensity-modulated beams by modulating the intensity of red, green and blue beams in accordance with red, green, and blue image data components of said image data;

synthesizing means for converting said intensity-modulated beams into a single synthesized color beam;

a rotatable polygon mirror for scanning said single synthesized color beam onto said color photographic paper in the widthwise direction; and means for transporting said color photographic paper synchronously with the rotation of said polygon mirror.

18. A photo finishing system according to claim 15, further comprising a cutter for cutting said color negative film passed through said image pickup unit into negative film pieces of a predetermined length, and inserting means for inserting said negative film pieces into pockets of a film sheath.

19. A photo finishing system according to claim 15, further comprising a splicer unit for sequentially splicing with a splice tape said color negative films passed through said image pickup unit so as to form an elongated film.

20. A photo finishing system according to claim 15, further comprising film winding unit means for winding said color negative film, passed through said image pickup unit, into a preservative cartridge.

21. A photo finishing system according to claim 15, wherein said preservative cartridge includes a cartridge body, and a spool rotatably housed within said cartridge body for winding said color negative film about the outer circumference of said spool.

* * * * *